(12) United States Patent
Sebald

(10) Patent No.: US 8,057,184 B2
(45) Date of Patent: Nov. 15, 2011

(54) PROPELLER BLADE BEARING, ESPECIALLY FOR PROPELLER BLADES OF AIRCRAFT PROPELLERS THAT CAN BE ADJUSTED ALONG THEIR LONGITUDINAL AXIS

(75) Inventor: Wilhelm Sebald, Bad Koenigshofen (DE)

(73) Assignee: Schaeffler KG, Herzogenaurach (DE)

( * ) Notice: Subject to any disclaimer, the term of this patent is extended or adjusted under 35 U.S.C. 154(b) by 1117 days.

(21) Appl. No.: 11/721,799

(22) PCT Filed: Dec. 13, 2005

(86) PCT No.: PCT/DE2005/002248
§ 371 (c)(1),
(2), (4) Date: Aug. 24, 2007

(87) PCT Pub. No.: WO2006/063572
PCT Pub. Date: Jun. 22, 2006

(65) Prior Publication Data
US 2008/0279689 A1    Nov. 13, 2008

(30) Foreign Application Priority Data
Dec. 14, 2004 (DE) .................... 10 2004 060 022

(51) Int. Cl.
*B64C 11/06* (2006.01)
(52) U.S. Cl. .................... 416/174; 416/205; 384/465
(58) Field of Classification Search ................. 416/147, 416/174, 205, 246; 384/465, 462, 471, 473, 384/461, 490, 513, 515
See application file for complete search history.

(56) References Cited

U.S. PATENT DOCUMENTS

| 2,438,542 | A | * | 3/1948 | Cushman | 416/147 |
| 4,921,403 | A | * | 5/1990 | Poucher et al. | 416/147 |
| 5,415,527 | A | * | 5/1995 | Godwin | 416/205 |

FOREIGN PATENT DOCUMENTS

| DE | 3818466 A | | 12/1989 |
| DE | 4315080 A1 | * | 11/1994 |
| GB | 469774 A | | 8/1937 |
| JP | 02035216 A | * | 2/1990 |

\* cited by examiner

*Primary Examiner* — Edward Look
*Assistant Examiner* — Ryan Ellis
(74) *Attorney, Agent, or Firm* — Lucas & Mercanti, LLP

(57) ABSTRACT

The invention relates to a propeller blade bearing, for the propeller blades of aircraft propellers that can be adjusted along their longitudinal axis, a plurality of propeller blades being individually fastened on a propeller hub in a corresponding number of blade seats. Every propeller blade, at its blade base, has a primary adjustable bearing and a secondary adjustable bearing and is received so as to be rotatable along its longitudinal axis inside a blade seat. The primary and the secondary adjustable bearing are configured as angular contact ball bearings that have respective upper bearing races and lower bearing races and rolling bodies interposed between said bearing races. A lubricating oil reservoir is arranged in the propeller hub and supplies the primary and the secondary adjustable bearing with lubricating oil when the propeller rotates. Every propeller blade is configured as a completely pre-assembled unit with the primary adjusting bearing and the secondary adjusting bearing. The upper bearing races of the primary and the secondary adjustable bearing are connected to respective lubricating oil overflow rings which axially enclose the lower bearing races on one side and which allow to store the lubricating oil from the lubricating oil reservoir in the propeller hub mainly in the adjustable bearings.

9 Claims, 1 Drawing Sheet

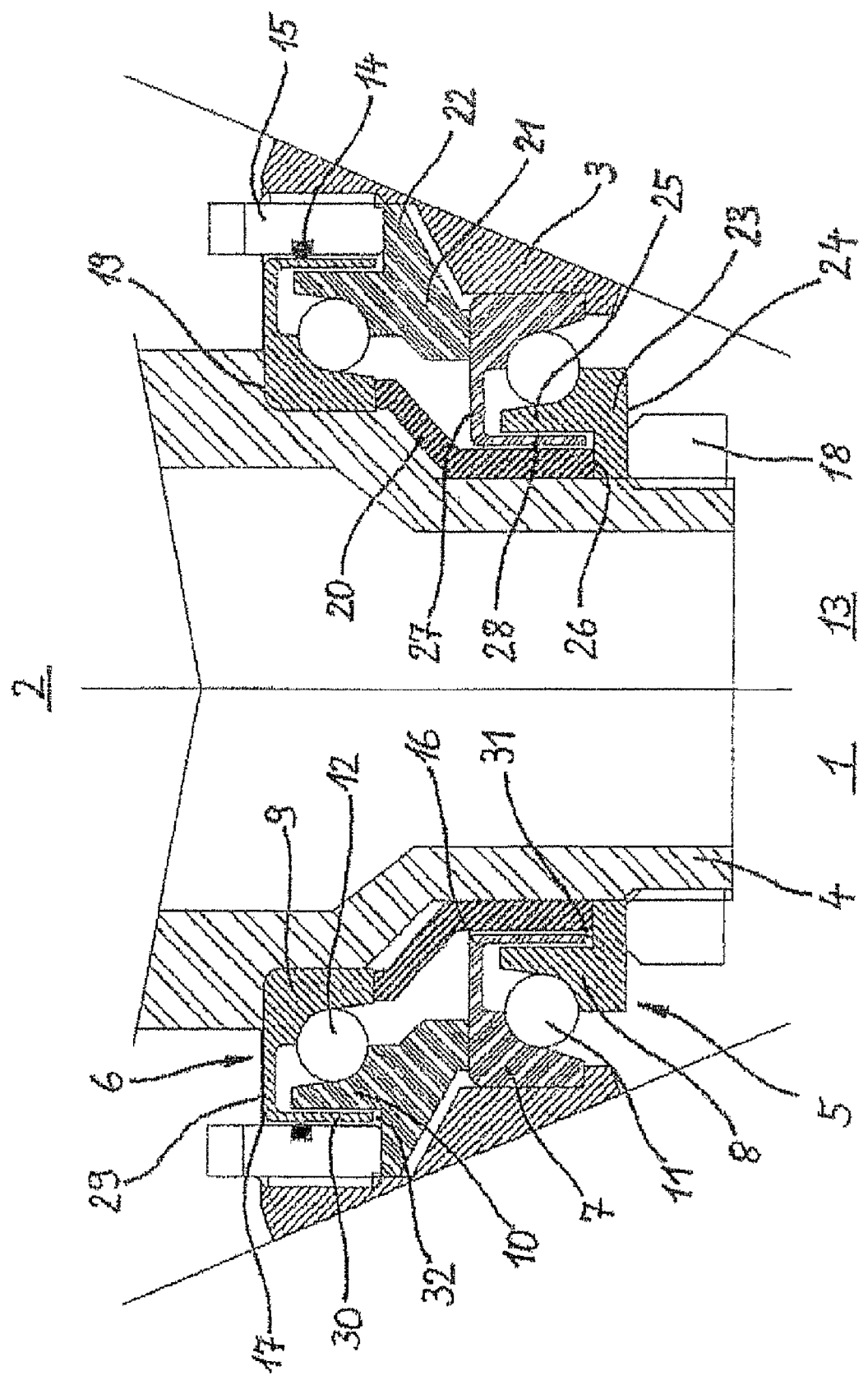

PROPELLER BLADE BEARING, ESPECIALLY FOR PROPELLER BLADES OF AIRCRAFT PROPELLERS THAT CAN BE ADJUSTED ALONG THEIR LONGITUDINAL AXIS

FIELD OF THE INVENTION

The invention relates to a propeller blade bearing arrangement that can be particularly advantageously implemented on longitudinally axially adjustable propeller blades of aircraft propellers.

BACKGROUND OF THE INVENTION

It is generally known to a person skilled in the art of propeller drives of aircraft that adjustable propeller blades of aircraft propellers serve to optimize the propeller efficiency in order to obtain an optimum propeller blade position for all propeller speeds. For this reason, it is necessary to individually fasten the propeller blades of the aircraft propeller to the propeller hub and, for facilitated adjustability, to mount said propeller blades in corresponding rolling bearings. A propeller blade bearing arrangement of said type is for example known from the British patent GB 2 244 525 A and is composed substantially of a propeller hub, to which a plurality of propeller blades are individually fastened in a corresponding number of blade receptacles of a blade carrier ring. Each propeller blade has, at its blade root, a primary adjustment bearing and a secondary adjustment bearing and is longitudinally axially mounted within a blade receptacle so as to be rotatable, with both the primary adjustment bearing and the secondary adjustment bearing being designed as angular rolling bearings which are arranged so as to be longitudinally axially spaced apart from one another and are braced against one another. Both adjustment bearings have one upper race and one lower race each and a row of rolling bodies which are arranged between said races, with the primary adjustment bearing being formed in a physical embodiment by an angular contact ball bearing, while the secondary adjustment bearing is designed as an angular roller bearing. In order to lubricate the entire adjustment mechanism for the propeller blades, a lubricating oil reservoir is arranged in the propeller hub, from which lubricating oil reservoir the primary and the secondary bearings are also supplied with lubricating oil by means of centrifugal force as the propeller rotates in order to avoid wear.

The assembly of the known propeller blade bearing arrangement takes place substantially in such a way that a bearing support sleeve, which surrounds the blade root of the propeller blade and forms in each case the seat of the upper races of the adjustment bearings, is initially assembled in two halves on the blade root, before the upper bearing rings, which are likewise composed of two halves, of the adjustment bearings are placed on said bearing support sleeve and can be connected in a suitable way to form continuous rings. A two-part cage is subsequently placed around the upper race of the secondary adjustment bearing and connected to form a ring, so that the rolling bodies of the secondary adjustment bearing can be inserted into the cage. A sleeve which partially has a thread at the outer side and, in the assembled state, forms, with a part of its inner side, the lower running track of the secondary adjustment bearing, is then pushed loosely, together with a cage for the rolling bodies of the primary adjustment bearing, over the blade root of the propeller blade, and the rolling bodies of the primary adjustment bearing are subsequently inserted into the cage. The loose sleeve on the blade root is thereafter pulled over the rolling bodies of the secondary adjustment bearing until said sleeve bears at the inside against said rolling bodies as a lower race, and subsequently, a two-part blade receptacle which, at the inside, contains the likewise two-part upper race of the primary adjustment bearing, is braced around the blade root in such a way that the upper race of the primary adjustment bearing rests on the rolling bodies of the latter. Finally, a threaded bracing ring which is supported against the assembled blade receptacle is screwed onto the thread of the sleeve, which is loose up until that time, on the blade root, so that on the one hand the outer race of the secondary adjustment bearing, which is formed by the inner side of the loose sleeve, is braced against the rolling bodies of the latter, and on the other hand, the two adjustment bearings of the propeller blade bearing arrangement are braced against one another. At the same time, the point at which the blade root emerges from the blade receptacle is sealed off in an oil-tight fashion by means of two seals which are arranged between the sleeve, which is designed at the inner side as a lower bearing ring of the secondary adjustment bearing, and the bearing support ring, and also between said sleeve and the blade receptacle.

A disadvantage of said known propeller blade bearing arrangement is, however, that the specific arrangement and design of the adjustment bearings for the propeller blade requires a largely two-part design of the entire propeller bearing arrangement, as a result of which a multiplicity of individual parts are required for each propeller bearing arrangement, which above all disadvantageously increases the risk of errors in their assembly. Since said individual parts must additionally be produced extremely precisely and with fitting accuracy with respect to one another, there is also a considerable time and cost expenditure for the assembly of the propeller blades to the propeller hub in addition to the high expenditure for production, so that a propeller blade bearing arrangement of said type entails very high overall production costs. Furthermore, from a safety-related point of view, a considerable disadvantage of said known propeller blade bearing arrangement is that the lubricating oil, which rises out of the lubricating oil reservoir in the propeller hub as a result of centrifugal force as the propeller rotates, can flow unhindered through the two adjustment bearings, and therefore at high propeller speeds, bears with a pressure which corresponds to the centrifugal acceleration against the two seals which are arranged at the point at which the blade root emerges from the blade receptacle. This can, in the case of a damaged seal at one of the propeller blade bearing arrangements of the aircraft propeller, lead to the loss of the entire quantity of lubricating oil in the propeller hub, which can result in failure of lubrication in the adjustment mechanism and the adjustment bearings of the propeller blade bearing arrangement as well as in function failures while the aircraft is in operation.

OBJECT OF THE INVENTION

Proceeding from the presented disadvantages of the known prior art, the invention is therefore based on the object of designing a propeller blade bearing arrangement, in particular for longitudinally axially adjustable propeller blades of aircraft propellers, with which the expenditure for the production of the individual parts of the bearing arrangement and the expenditure for the assembly of the propeller blade on the propeller hub can be reduced to a minimum and which is designed with a fail-safe function which, in the case of a damaged seal at the point at which the blade root emerges from the blade carrier ring, effectively prevents a loss of the entire quantity of lubricating oil in the propeller hub.

DESCRIPTION OF THE INVENTION

According to the invention, said object is achieved in a propeller blade bearing arrangement in that each propeller blade is designed as a fully preassembled modular unit with the two races and the rolling bodies of the primary adjustment bearing and of the secondary adjustment bearing, which modular unit can be screwed in the blade receptacle of the blade carrier ring in a lubricating-oil-tight fashion by means of an upper ring nut which is formed with a sealing with respect to the blade root of the propeller blade. The upper races of the primary and of the secondary adjustment bearing are connected to lubricating oil surge rings which enclose the lower races of said primary and of said secondary adjustment bearing axially at one side, by means of which lubricating oil surge rings the lubricating oil, which rises out of the lubricating oil reservoir in the propeller hub as a result of centrifugal force as the propeller blades rotate, can be stored largely within the adjustment bearings. At the same time, it is ensured by means of the lubricating oil surge rings on the adjustment bearings in conjunction with a defined filling quantity in the lubricating oil reservoir that the lubricating oil bears in only a small quantity and approximately unpressurized against the seal of the upper ring nut.

In one expedient refinement of the propeller blade bearing arrangement designed according to the invention, the preassembled modular unit composed of the propeller blade and the complete adjustment bearings is formed in that the primary adjustment bearing and the secondary adjustment bearing are braced against an annular shoulder on the blade root of the propeller blade by a lower ring nut via spacers which are arranged between said primary adjustment bearing and secondary adjustment bearing. Said annular shoulder is arranged at a conical transition region of the blade root to the propeller blade, and at the same time, axially forms the bearing seat for the upper race of the secondary adjustment bearing which is of greater diameter than the primary adjustment bearing. The bearing seat of the primary adjustment bearing is, in contrast, realized via the lower race of the latter and is arranged directly at the blade root of the propeller blade, with the lower end of the blade root of the propeller blade being formed with an external thread which is complementary to the internal thread of the lower ring nut.

Furthermore, as a further feature of the propeller blade bearing arrangement designed according to the invention, the spacers used between the adjustment bearings are on the one hand an inner spacer sleeve which is arranged between the lower race of the primary adjustment bearing and the upper race of the secondary adjustment bearing and that has a cross-sectional shape which is matched to the shape of the blade root and opens conically upward. On the other hand, an outer spacer ring is arranged as a further spacer between the upper race of the primary adjustment bearing and the lower race of the secondary adjustment bearing, which outer spacer ring is preferably designed, so as to reduce the number of individual parts of the propeller blade bearing arrangement and the risk of assembly errors, as a single-part integral component with the lower race of the secondary adjustment bearing. Regardless of whether the outer spacer ring is formed in one piece with the lower race of the secondary adjustment bearing or as a separate component, said outer spacer ring also has, at its outer side, additionally an annular web of increased diameter as a further integrated element, by means of which the blade root of the propeller blade can ultimately be screwed by the upper ring nut in the blade receptacle of the blade carrier ring of the propeller hub. In an advantageous embodiment of the propeller blade bearing arrangement designed according to the invention, it is additionally proposed that the lower race of the primary adjustment bearing preferably has a T-shaped cross-sectional profile, which is rotated by 180° with respect to the longitudinal central axis of the propeller hub, and is placed with the inner side of the transverse limb of said profile on the blade root of the propeller blade so as to form the bearing seat of the primary adjustment bearing. The underside of said transverse limb is at the same time designed as a pressure face for the lower ring nut, while the longitudinal limb and the outer part of the transverse limb of the profile of the lower race form the rolling body running face of the lower race of the primary adjustment bearing. The annular face, which is formed by the profile of the lower race of the primary adjustment bearing, between the blade root of the propeller blade and the longitudinal limb of said profile is advantageously additionally utilized as a contact face, at which the inner spacer sleeve, which bears against the lower race of the secondary bearing, is supported on the primary bearing between the primary adjustment bearing and the secondary adjustment bearing.

A further feature of the propeller blade bearing arrangement designed according to the invention is that the lubricating oil surge rings which are connected to the upper races of the primary and of the secondary adjustment bearing are preferably designed as angle rings which are formed in one piece with the upper race, which angle rings, with the horizontal limb of their profile, form an extension of the upper side of the upper races, and with the vertical limb of their profile, are aligned toward the propeller hub. It has proven to be particularly advantageous to design the vertical limb of the lubricating oil surge rings of the two adjustment bearings with a length which corresponds approximately to the height of the upper race of the respective adjustment bearing in order that the upper races of the two adjustment bearings form a relatively large annular space together with the lubricating oil surge rings. In this annular space which encloses the lower race of the adjustment bearings and which is open only toward the propeller hub, a relatively large quantity of the, during rotation of the propeller, centrifugally accelerated lubricating oil from the lubricating oil reservoir of the propeller hub, can collect and always ensure sufficient lubrication of the adjustment bearings. The single-part design of the lubricating oil surge rings with the upper races of the adjustment bearings serves again to reduce the number of individual parts of the propeller bearing arrangement, though it should not be precluded that said lubricating oil surge rings can also be designed as separate components and be suitably connected to the upper races of the adjustment bearings.

It is finally also proposed as a final feature of the propeller blade bearing arrangement designed according to the invention that the vertical limb of the lubricating oil surge ring of the primary adjustment bearing is arranged between the longitudinal limb of the profile of the lower race of the primary adjustment bearing and the inner spacer sleeve in such a way that a remaining gap between the inner side of the lubricating oil surge ring and the outer side of the longitudinal limb of the lower race, and between the outer side of the spacer sleeve and the inner side of the lubricating oil surge ring, forms a lubricating oil overflow labyrinth to the secondary adjustment bearing. That limb of the lubricating oil surge ring of the secondary adjustment bearing which is likewise aligned toward the propeller hub is, in the same way, arranged between the lower race of the secondary adjustment bearing and the upper ring nut, so that here, too, a remaining gap between the inner side of the lubricating oil surge ring and the outer side of the lower race, and between the outer side of the lubricating oil surge ring and the inner side of the ring nut, forms a lubricating oil overflow labyrinth to the seal of the upper ring nut.

Said lubricating oil overflow labyrinths on both adjustment bearings serve to reduce the pressure of the lubricating oil which is accelerated centrifugally out of the propeller hub as the propeller rotates, as a result of which the lubricating oil bears approximately unpressurized against the seal, which seals off the point at which the blade root emerges from the blade receptacle of the blade carrier ring, on the upper ring nut. This takes place in such a way that the lubricating oil which rises out of the propeller hub initially fills only the annular space, formed by the lubricating oil surge ring, in the primary bearing. The quantity of lubricating oil which can no longer be stored in the primary adjustment bearing is then pressed by centrifugal force through the overflow labyrinth on the primary adjustment bearing into the cavity formed between the inner spacer sleeve and the outer spacer ring, from where said lubricating oil passes under centrifugal force into the secondary adjustment bearing, and is stored there in turn in the annular space formed by the lubricating oil surge ring of said secondary adjustment bearing. With corresponding dimensioning of the lubricating oil filling quantity, only a small quantity of excess lubricating oil can then flow via the lubricating oil overflow labyrinth on the secondary adjustment bearing to the seal on the upper ring nut, with said small quantity of lubricating oil no longer exerting any damaging pressure loadings on the seal. Should damage to the seal on the upper ring nut nevertheless occur, then only said small quantity of lubricating oil can be lost, since most of the lubricating oil is stored by the lubricating oil surge rings in the adjustment bearings of the propeller blade bearing arrangement.

The propeller blade bearing arrangement designed according to the invention therefore has the advantage over the propeller blade bearing arrangements known from the prior art that, by means of the design of the propeller blade as a fully pre-assembled modular unit with the primary bearing and the secondary bearing, the expenditure for the production of the individual parts of the propeller blade bearing arrangement and the expenditure for the assembly of the propeller blades on the propeller hub is reduced to a minimum. It is possible during the pre-assembly of the modular unit to use angular rolling bearings, which are merely slightly modified at their races and are known per se, both for the primary adjustment bearing and for the secondary adjustment bearing, which angular rolling bearings can be produced cost-effectively and are fastened to the blade root with a precisely-set preload with respect to one another. The propeller blade which is pre-assembled in this way can then be inserted into a single-part blade receptacle of the blade carrier ring on the propeller hub, and is screwed to the propeller hub merely by means of an upper ring nut, so that, as a result of the small number of individual parts for the propeller blade bearing arrangement, the assembly expenditure and the risk of assembly errors is considerably reduced, and the production costs of the propeller blade bearing arrangement are reduced overall. Furthermore, as a result of the design of the primary adjustment bearing and of the secondary adjustment bearing with lubricating oil surge rings which axially enclose their lower races, the propeller blade bearing arrangement designed according to the invention has sufficient lubrication, at all times, of the adjustment mechanism and of the adjustment bearings, and also a fail-safe function, as a result of which, in the case of a damaged seal at the point at which the blade root emerges from the blade carrier ring, only a small quantity of lubricating oil can be lost, but a loss of the entire quantity of lubricating oil in the propeller hub is effectively prevented.

BRIEF DESCRIPTION OF THE DRAWINGS

One preferred embodiment of the propeller blade bearing arrangement designed according to the invention is explained in more detail below with reference to the appended drawing. Here, the single FIGURE shows a sectioned view through a bearing arrangement, designed according to the invention, of a propeller blade.

DETAILED DESCRIPTION OF THE DRAWINGS

The drawing clearly shows a propeller blade bearing arrangement for a longitudinally axially adjustable propeller blade of an aircraft propeller, which propeller blade bearing arrangement is composed substantially of a propeller hub 1 (not illustrated in any more detail), to which a plurality of propeller blades 2 (only indicated in the drawing) are individually fastened in a corresponding number of blade receptacles 3 of a blade carrier ring. Each propeller blade 2 has, at its blade root 4, a primary adjustment bearing 5 and a secondary adjustment bearing 6 and is longitudinally axially mounted within a blade receptacle 3 so as to be rotatable, with both the primary adjustment bearing 5 and the secondary adjustment bearing 6 being designed as angular rolling bearings which are arranged so as to be longitudinally axially spaced apart from one another and are braced against one another. The primary adjustment bearing 5, like the secondary adjustment bearing 6, has one upper race 7, 9 and one lower race 8, 10 and also rolling bodies 11, 12 which are arranged between said races 7, 9, 8, 10, with both adjustment bearings 5, 6 being designed as angular contact ball bearings with different bearing bores. In order to lubricate the entire adjustment mechanism for the propeller blades 2, a lubricating oil reservoir 13 (likewise only indicated in the drawing) is arranged in the propeller hub 1, from which lubricating oil reservoir 13 the primary and the secondary bearings 5, 6 are supplied with lubricating oil by means of centrifugal force as the propeller rotates.

The drawing also clearly shows that each propeller blade 2 is designed according to the invention as a fully pre-assembled modular unit in each case with the two races 7, 9, 8, 10 and the rolling bodies 11, 12 of the primary adjustment bearing 5 and of the secondary adjustment bearing 6, which modular unit can be screwed in the blade receptacle 3 of the blade carrier ring in a lubrication-oil-tight fashion by means of an upper ring nut 15 which is formed with a seal 14 with respect to the blade root 4 of the propeller blade 2. Clearly visible, the upper races 7 and 9 of the primary and of the secondary adjustment bearing 5 and 6 are connected to lubricating oil surge rings 16, 17 which in each case enclose the lower races 8 and 10 of said primary and of said secondary adjustment bearing 5 and 6 axially at one side, by means of which lubricating oil surge rings 16, 17 the lubricating oil, which rises out of the lubricating oil reservoir 13 in the propeller hub 1 as a result of centrifugal force as the propeller blades 2 rotate, is stored largely within the adjustment bearings 5, 6, and by means of which lubricating oil surge rings 16, 17, in conjunction with a defined filling quantity in the lubricating oil reservoir 13, the lubricating oil bears in only a small quantity and approximately unpressurized against the seal 14 of the upper ring nut 15.

Here, the pre-assembled modular unit composed of the propeller blade 2 and the complete adjustment bearings 5, 6 is formed in that the primary adjustment bearing 5 and the secondary adjustment bearing 6 are braced against an annular shoulder 19 on the blade root 4 of the propeller blade 2 by a lower ring nut 18 via spacers which are arranged between said primary adjustment bearing 5 and secondary adjustment bearing 6. As the drawing also shows, the spacers between the adjustment bearings 5, 6 are designed on the one hand as an inner spacer sleeve 20 which is arranged between the lower race 8 of the primary adjustment bearing 5 and the upper race 9 of the secondary adjustment bearing 6, and on the other hand as an outer spacer ring 21 which is arranged between the upper race 7 of the primary adjustment bearing 5 and the lower race 10 of the secondary adjustment bearing 6, with the outer spacer ring 21 being designed as a single-part integral component with the lower race 10 of the secondary adjustment bearing 6. In addition, said outer spacer ring 21 also has an annular web 22 of increased diameter, by means of which the blade root 4 of the propeller blade 2 is screwed by the upper ring nut 15 in the blade carrier ring 3 of the propeller hub 1.

It is also clear from the drawing, that the lower race 8 of the primary adjustment bearing 5 has a T-shaped cross-sectional profile, which is rotated by 180° with respect to the longitudinal central axis of the propeller hub 1, and is placed with the inner side of the transverse limb 23 of said profile on the blade root 4 of the propeller blade 2. The underside 24 of said transverse limb 23 is at the same time designed as a pressure face for the lower ring nut 18, while the longitudinal limb 25 and a part of the transverse limb 23 of the profile of the lower race 8 of the primary adjustment bearing 5 form the rolling body running face, which is embodied as a ball groove, of the lower race 8. The annular face 26, which is formed by the profile of the lower race 8 of the primary adjustment bearing 5, between the blade root 4 of the propeller blade 2 and the longitudinal limb 25 of said profile is additionally utilized as a contact face, at which the inner spacer sleeve 20, which bears against the lower race 8 of the secondary bearing 6, is supported on the primary bearing 5 between the primary adjustment bearing 5 and the secondary adjustment bearing 6.

The lubricating oil surge rings 16, 17 which are connected to the upper races 7, 9 of the primary and of the secondary adjustment bearing 5, 6 are also, as is clearly illustrated in the drawing, formed by angle rings which are formed in one piece with the upper races 7, 9, which angle rings, with the horizontal limb 27, 29 of their profile, form an extension of the upper side of the upper races 7, 9, and with the vertical limb 28, 30 of their profile, are aligned toward the propeller hub 1. Here, the vertical limb 28 of the lubricating oil surge ring 16 of the primary adjustment bearing 5 is arranged between the longitudinal limb 25 of the profile of the lower race 8 of the primary adjustment bearing 5 and the inner spacer sleeve 20 in such a way that a remaining gap between the inner side of the lubricating oil surge ring 16 and the outer side of the longitudinal limb 25 of the lower race 8 and between the outer side of the spacer sleeve 20 and the inner side of the lubricating oil surge ring 16 forms a lubricating oil overflow labyrinth 31 to the secondary adjustment bearing. In the same way, the vertical limb 30 of the lubricating oil surge ring 17 of the secondary adjustment bearing 6 is also arranged between the lower race 10 of the secondary adjustment bearing 6 and the upper ring nut 15, so that at this point, too, a remaining gap between the inner side of the lubricating oil surge ring 17 and the outer side of the lower race 10 and between the outer side of the lubricating oil surge ring 17 and the inner side of the ring nut 15 forms a lubricating oil overflow labyrinth 32 to the seal 14 of the upper ring nut 15.

LIST OF REFERENCE SYMBOLS

1 Propeller hub
2 Propeller blade
3 Blade receptacle
4 Blade root
5 Primary adjustment bearing
6 Secondary adjustment bearing
7 Upper race of 5
8 Lower race of 5
9 Upper race of 6
10 Lower race of 6
11 Rolling bodies of 5
12 Rolling bodies of 6
13 Lubricating oil reservoir
14 Seal
15 Upper ring nut
16 Lubricating oil surge ring on 5
17 Lubricating oil surge ring on 6
18 Lower ring nut
19 Annular shoulder
20 Inner spacer sleeve
21 Outer spacer ring
22 Annular web
23 Transverse limb
24 Underside
25 Longitudinal limb
26 Annular face
27 Horizontal limb of 16
28 Vertical limb of 17
29 Horizontal limb of 17
30 Vertical limb of 17
31 Lubricating oil overflow labyrinth
32 Lubricating oil overflow labyrinth

The invention claimed is:

1. A propeller blade bearing arrangement for longitudinally axially adjustable propeller blades of aircraft propellers, comprising:
a propeller hub, to which a plurality of propeller blades are individually fastened in a corresponding number of blade receptacles of a blade carrier ring,
each propeller blade has, at its blade root, a primary adjustment bearing and a secondary adjustment bearing and is longitudinally axially mounted within a blade receptacle so as to be rotatable,
both the primary adjustment bearing and the secondary adjustment bearing are designed as angular rolling bearings which are arranged so as to be longitudinally axially spaced apart from one another and are braced against one another,
the primary and the secondary adjustment bearing has in each case one upper race and one lower race and also rolling bodies which are arranged between said races,
a lubricating oil reservoir is arranged in the propeller hub, from which lubricating oil reservoir the primary and the secondary bearings are supplied with lubricating oil by means of centrifugal force as the propeller rotates, wherein
each propeller blade is designed as a fully pre-assembled modular unit with the two races and the rolling bodies of the primary adjustment bearing and of the secondary adjustment bearing,
which modular unit can be screwed in the blade receptacle of the blade carrier ring in a lubricating-oil-tight fashion by means of an upper ring nut which is formed with a seal with respect to the blade root of the propeller blade, with the upper races of the primary and of the secondary adjustment bearing are connected to lubricating oil surge rings which enclose the lower races of said primary and of said secondary adjustment bearing axially at one side, by means of which lubricating oil surge rings the lubricating oil, which rises out of the lubricating oil reservoir in the propeller hub as a result of centrifugal force as the propeller blades rotate, can be stored largely within the adjustment bearings, and by means of which lubricating oil surge rings, in conjunction with a defined filling quantity in the lubricating oil reservoir, the lubricating oil bears in only a small quantity and almost unpressurized against the seal of the upper ring nut.

2. The propeller blade bearing arrangement as claimed in claim 1, wherein the pre-assembled modular unit composed of the propeller blade and the complete adjustment bearings is formed in that the primary adjustment bearing and the secondary adjustment bearing are braced against an annular shoulder on the blade root of the propeller blade by a lower ring nut via spacers which are arranged between said primary adjustment bearing and secondary adjustment bearing.

3. The propeller blade bearing arrangement as claimed in claim 2, wherein the spacers between the adjustment bearings are designed on the one hand as an inner spacer sleeve which is arranged between the lower race of the primary adjustment bearing and the upper race of the secondary adjustment bearing, and on the other hand as an outer spacer ring which is arranged between the upper race of the primary adjustment bearing and the lower race of the secondary adjustment bearing.

4. The propeller blade bearing arrangement as claimed in claim 3, wherein the outer spacer ring between the primary and the secondary adjustment bearing is preferably designed as a single-part integral component with the lower race of the secondary adjustment bearing, and additionally has an annular web of increased diameter, by means of which the blade root of the propeller blade can be screwed by the upper ring nut in the blade receptacle of the blade carrier ring of the propeller hub.

5. The propeller blade bearing arrangement as claimed in claim 3, wherein the lower race of the primary adjustment bearing preferably has a T-shaped cross-sectional profile, which is rotated by 180° with respect to the longitudinal central axis of the propeller hub, and is placed with the inner side of the transverse limb of said profile on the blade root of the propeller blade, with the underside of said transverse limb at the same time being designed as a pressure face for the lower ring nut.

6. The propeller blade bearing arrangement as claimed in claim 5, wherein the longitudinal limb and a part of the transverse limb of the profile of the lower race of the primary adjustment bearing form the rolling body running face of the lower race, and the annular face between the blade root of the propeller blade and the longitudinal limb is designed as a contact face of the primary adjustment bearing to the inner spacer sleeve which is arranged between said primary adjustment bearing and the secondary adjustment bearing.

7. The propeller blade bearing arrangement as claimed in claim 6, wherein the lubricating oil surge rings which are connected to the upper races of the primary and of the secondary adjustment bearing are preferably designed as angle rings which are formed in one piece with the upper races, which angle rings, with the horizontal limb of their profile, form an extension of the upper side of the upper races, and with the vertical limb of their profile, are aligned toward the propeller hub.

8. The propeller blade bearing arrangement as claimed in claim 7, wherein the vertical limb of the lubricating oil surge ring of the primary adjustment bearing is arranged between the longitudinal limb of the profile of the lower race of the primary adjustment bearing and the inner spacer sleeve in such a way that a remaining gap between the lubricating oil surge ring and the lower race as well as the spacer sleeve forms a lubricating oil overflow labyrinth to the secondary adjustment bearing.

9. The propeller blade bearing arrangement as claimed in claim 8, wherein the vertical limb of the lubricating oil surge ring of the secondary adjustment bearing is arranged between the lower race of the secondary adjustment bearing and the upper ring nut in such a way that a remaining gap between the lubricating oil surge ring and the lower race as well as the upper ring nut forms a lubricating oil overflow labyrinth to the seal of the ring nut.

\* \* \* \* \*